Figure 1:
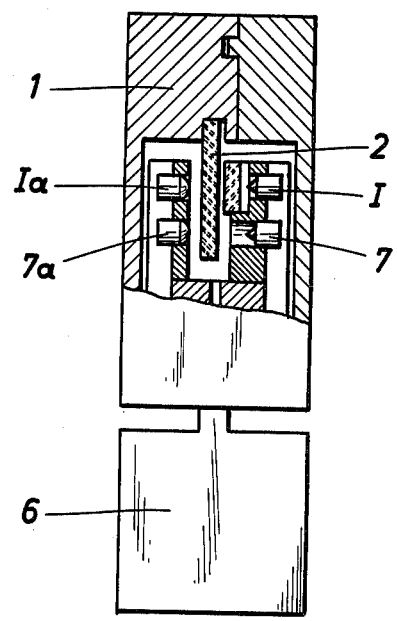

United States Patent [19]

Rieder et al.

[11] 4,158,509
[45] Jun. 19, 1979

[54] INSTRUMENT FOR MEASURING LENGTHS

[76] Inventors: Heinz Rieder, Ostermiething 154;
Max Schwaiger, Ostermiething 298,
both of Austria

[21] Appl. No.: 819,568

[22] Filed: Jul. 27, 1977

[30] Foreign Application Priority Data

Aug. 19, 1976 [AT] Austria .................................. 6175/76

[51] Int. Cl.² ............................................ G01B 11/02
[52] U.S. Cl. .................................. 356/395; 33/125 C;
250/237 G
[58] Field of Search .............................. 356/169, 170;
250/237 G; 33/125 A, 125 C

[56] References Cited

U.S. PATENT DOCUMENTS

| | | | |
|---|---|---|---|
| 3,371,335 | 2/1968 | Seewald | 356/169 |
| 3,496,374 | 2/1970 | Burr et al. | 356/170 |
| 3,671,750 | 6/1972 | Heitmann et al. | 356/169 |

Primary Examiner—John K. Corbin
Assistant Examiner—R. A. Rosenberger
Attorney, Agent, or Firm—Kurt Kelman

[57] ABSTRACT

A scale assembly is provided with a scale which has a predetermined scale increment. The scale assembly consists of a plurality of scale sections, each of which is provided with a length portion of said scale and which are separated by joints having in the longitudinal direction of said scale a width that is smaller than a predetermined width. A measuring slide is movable along said scale and carries first and second photoelectric sensor means, which are spaced apart along said scale by a distance which exceeds said predetermined width. Each of said sensor means are adapted to be enabled and when enabled are adapted to photoelectrically scan said scale and to deliver a predetermined number of length signals in response to the movement of said slide along said scale to the extent of each of said increments. Integrating means are provided for integrating each of said length signals from each of said sensor means which are enabled. A change-over switch is shiftable between first and second states and arranged to enable said first and second sensor means in said first and second positions, respectively. Control means are carried by said slide and arranged to shift said change-over switch from either of said states to the other in response to the movement of said sensor means which are enabled at a time to one of said joints.

13 Claims, 4 Drawing Figures

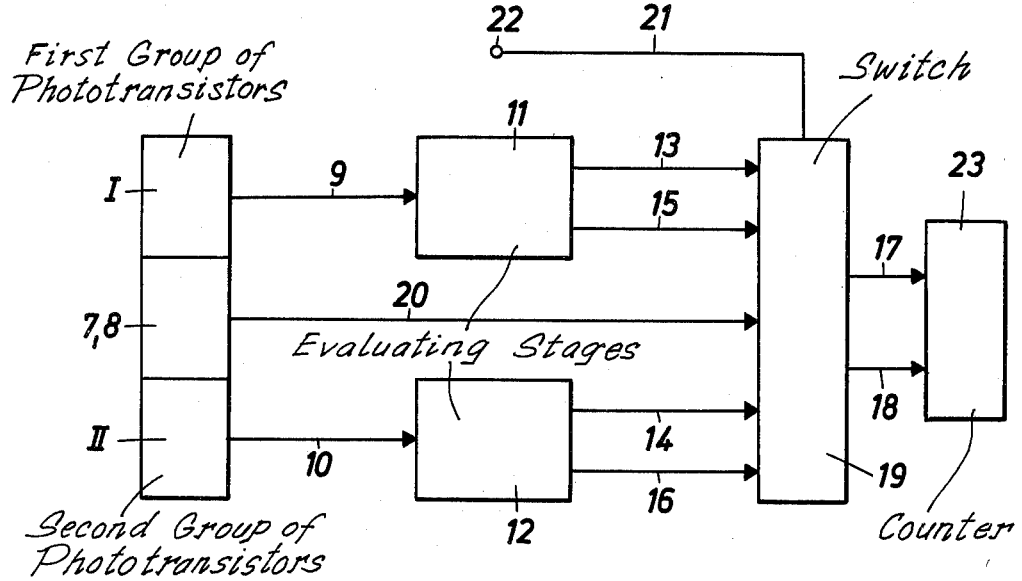
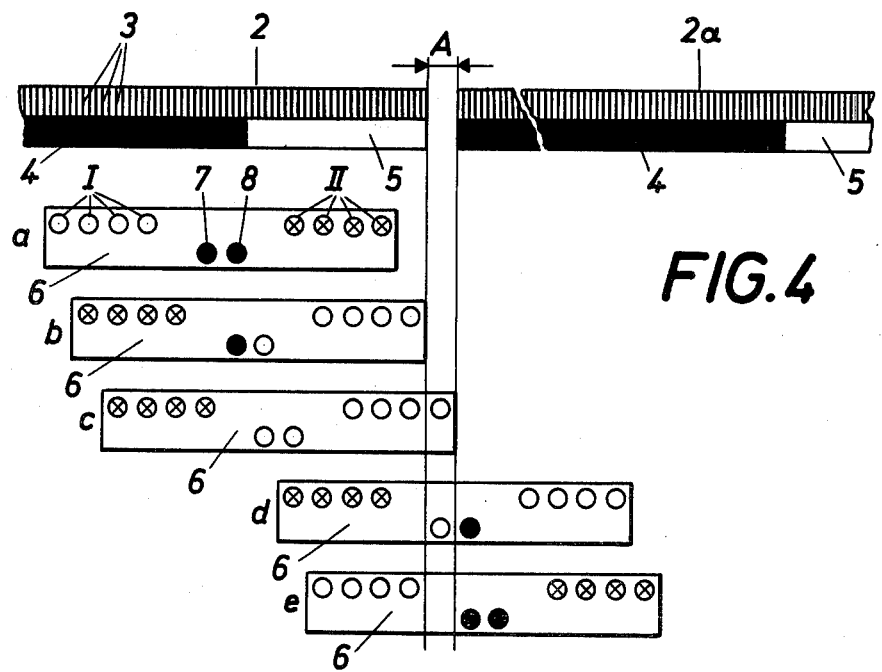

INSTRUMENT FOR MEASURING LENGTHS

This invention relates to an instrument for measuring lengths, comprising a scale assembly, which consists of two or more sections and is provided with an incremental scale, and a measuring slide, which is displaceable over said scale assembly and comprises phototransistors which serve to photoelectrically scan the incremental scale and to control counters or other means for indicating the measured length. The instrument preferably comprises control means which control the sign of the counting steps of the counters in dependence on the direction of the displacement of the slide.

Such instruments for measuring lengths can be used for a non-contacting photoelectric scanning of the incremental scale and for this reason are subject to very little wear so that a high accuracy of measurement can be maintained. By the use of suitable circuitry, the increments which are determined by the incremental scale can be divided into still smaller increments. Such circuitry may comprise phase multiplier circuits and potentiometer circuits having a plurality of outputs. If the incremental scale consists of alternating bright and dark fields of equal size, a phototransistor which is moved over such incremental scale will generate a sine voltage which has a wavelength that is equal to the sum of the lengths of a bright field and a dark field, i.e., to one increment of the incremental scale. If two or more phototransistors are arranged in such a manner that the distances between adjacent phototransistors are equal to the sum of an integral multiple of one scale increment and a fraction of one scale increment, it is possible to generate phase-displaced signals, which enable a phase multiplication and also a determination of the direction in which the measuring slide is moving over the scale. This determination of the direction of movement is important when a given length is not measured from a predetermined zero point but the slide may be advanced and retracted during the measurement so that in case of a measurement with reference to a zero point it is necessary to effect a substraction or a reverse counting during a displacement of the slide toward the zero point.

In practice it is possible to make incremental scales of glass which are relatively small in cross-section and have, e.g., a thickness of 2 mm and a width of, at most, 10 mm. On the other hand, it is difficult or even impossible to make integral scales which are small in cross-section and have any desired length, as is required for a measurement of large lengths. It would not be economical to make glass scales which are large in cross-section only because a scale having the required length can then be made in one piece. In practice, it would also be difficult to transport such long scales. Sections having the stated cross-sections which are required can be made at this time only up to a length of 1.5 m. For a measurement of larger lengths, a plurality of such sections are assembled. Previously, the sections have been adhesively joined. In that case, the width of the gap and adhesive joint must be controlled to an accuracy of the order of micrometers because the accuracy of measurement of the measuring instrument will otherwise be adversely affected. It will be understood that an assembling of the sections with such high accuracy is very difficult. Besides, the sections should be joined so that they are immovable relative to each other so that there will be no subsequent changes in accuracy. Even during the assembling, the permissible gap tolerances cannot always be adhered to and subsequent movements of the sections relative to each other may adversely affect the accuracy of measurement.

In accordance with the invention, an instrument of the kind described is characterized in that the measuring slide carries two groups of measuring phototransistors, which serve to scan the scale and are spaced apart by a distance which exceeds the largest possible width of the joint between two sections of the scale assembly, and a change-over switch is provided, which serves to connect only one of these groups at a time to the counter and preferably also to the sign controller, control means are provided, which are associated with respective joints between adjacent scale sections, and said change-over switch is arranged to be actuated by said control means in response to the movement of the slide over each of said joints so that said change-over switch connects the counter and, if desired, the sign controller, in alternation to the group which moves to and across the joint and to the respective other group.

To facilitate the understanding of the invention it is pointed out once more that the operation of the instrument for measuring lengths, which is of the kind described, resides simply in a counting of the number of counting steps performed during the movement from one point to another. The point of reference on the measuring slide need not be aligned with one of the phototransistors. If the measuring groups are identical, it makes no difference which of the two measuring groups is enables. Whenever a measuring group is moved across a joint, this group is disabled. The counting operation, and with it the measurement of length, is always effected by means of the measuring group which is associated in its entirety with a section of the scale assembly, so that the accuracy of measurement will not be adversely affected even when relatively large tolerances are allowed regarding the permissible width of joint. Even a shifting of the scale sections relative to each other before the measurement will not substantially affect the accuracy of measurement if the scale sections are held against any movement relative to each other in their longitudinal direction during the measurement. Because there may be large tolerances regarding the width of joint, the distance from the trailing end of the last scale increment of a preceding scale section to the leading end of the first scale increment of the succeeding scale section may differ from an integral multiple of one scale increment. In that case, the change from one measuring group to the other may involve slight phase displacements, which may result in practice in an error amounting to one counting step. In view of the large lengths to be measured, this error is within the permissible range and is smaller in practice than the error which occurred in the usual method of measurement using adhesively joined scale sections.

Various means may be provided to actuate the change-over switch and may consist adjacent to each joint of stops or control cams for actuating the switch. But because the scale is scanned by non-contacting means, non-contacting control means are preferably employed also for the switch and may consist of a magnetic switch (reed relay) of similar non-contacting control means. An arrangement having a particularly small space requirement and small power consumption comprises control tracks provided on the scale sections beside the incremental scale and additional controlling phototransistors, which are mounted on the slide and scan the control tracks and generate output signals for controlling the change-over switch. In this case, the change-over switch consists of an electronic switch (flip-flop).

Figure 2:
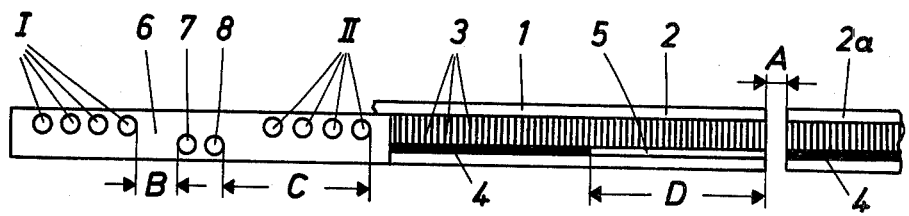

An embodiment of the invention is shown by way of example on the drawing, in which FIG. 1 is a partly transverse sectional view showing an instrument according to the invention for measuring lengths, FIG. 2 is a highly diagrammatic, fragmentary top plan view showing the essential elements of the instrument of FIG. 1 for measuring lengths, the housing shown in an open state, FIG. 3 is a block circuit diagram showing an instrument according to the invention for measuring lengths, and FIG. 4 serves to facilitate the understanding of the mode of operation and shows the region of a joint between two scale sections with a control track, which is disproportionately represented in exaggerated width, and also shows the slide in different positions.

It is apparent from FIGS. 1 and 2 that the instrument for measuring length comprises a guide housing 1, which contains a scale assembly, which consists of a plurality of glass sections 2, 2a, etc. and is provided with an incremental scale, which has been indicated by spaced apart graduations 3. The scale sections 2, 2a are provided beside the incremental scale 3 with a control-track 4. In this embodiment, the control track 4 is black, i.e., opaque, at one end of each scale section, and terminates in a transparent window 5 near the other end.

A measuring slide 6 is provided with two groups of measuring phototransistors I and II which face the incremental scale 3, and two controlling phototransistors 7, 8, which are offset from the measuring phototransistors I, II and face the track 4, 5. The slide 6 also carries light-emitting diodes Ia, 7a, which register with respective ones of the measuring phototransistors I and the controlling phototransistor 7, and corresponding light-emitting diodes, not shown, which register with the measuring phototransistors II and the controlling phototransistor 8. The slide is guided in the housing so that the light-emitting diodes and the measuring and controlling phototransistors carried by the slide can scan the scale 3 and the control track 4, 5 without contacting the same.

The transistors of the measuring groups I, II are arranged behind a screen, which comprises transparent and opaque areas in alternation and with the same increments as the incremental scale 3 on the scale sections 2, 2a and is moved over the incremental scale. The transistors of the measuring groups I, II are spaced such distances apart that when a given measuring group is enabled and the slide 6 is moved over the incremental scale the transistors of the measuring group which is enabled generate sine signals, which are displaced in phase from each other and are fed in leads 9, 10 to separate evaluating stages 11, 12, which generate digital counting pulses delivered via leads 13, 14, and also generate sign-indicating signals, which are delivered via leads 15 and 16 and indicate the direction in which the slide is being moved relative to the incremental scale 3. The signals delivered via leads 15, 16 determine the sign with which the counting pulses are applied by a lead 17 to a counter 23. The sign-indicating signal may be applied via a lead 18 to the counter so that the latter is controlled in dependence on the sign-indicating signals. A change-over switch 19 is provided, which is controlled via a lead 20 by the phototransistors, 7, 8 to assume either of two states. In one position, the switch 19 connects lead 13 to lead 17 and lead 15 to lead 18. In the other state, the switch 19 connects lead 14 to lead 17 and lead 16 to lead 18. A zero-resetting key 22 may be connected to the change-over switch by a lead 21 and may be operable to reset the counter to zero when the slide is in the zero position for the measurement.

The conversion of the sine signals generated by the measuring groups I, II into control signals for a digital control of a counter and for indicating the direction of movement of the slide is known per se and is not a subject matter of the present invention.

To ensure a correct control, the phototransistors I, II and 7, 8 should be arranged so that the following requirements are met: The width A of the joint between two scale sections 2, 2a must be less than the distance from each controlling phototransistor (7, 8) to the adjacent measuring phototransistor. This distance has only been indicated as distance B between the left-hand phototransistor 7 and the adjacent phototransistor of group I. The distance from the controlling phototransistor 8 to the adjacent transistor of the adjacent group II also equals B. The distance C indicated on the drawing must be somewhat smaller than the length D of the window 5. In the embodiment shown by way of example, the total distance between groups I and II is larger than 2B, owing to the nature of the control arrangement, i.e., that total distance is much larger than the width A of the joint. When it is not necessary to take the nature of the control arrangement into consideration, e.g., when the change between I and II is effected by stop-actuated switches, the distance between groups I and II must in any case be larger than A so that the terminal transistors of both groups cannot be disposed over the joint at the same time.

FIG. 4 shows the slide 6 in different possible postions, which are designated a to e. Each of the transistors of groups I and II which are enabled has been designated by an "x" mark. The controlling transistors 7, 8 have been shown as transparent components so that the track 4, the window 5 and the joint A are visible through these transistors.

In position a, both controlling transistors 7 and 8 are disposed over the control track 4 and the transistors of group II are enabled so that the signals delivered by them are converted in 11 to control signals, which are delivered via leads 13, 15, the change-over switch 19, which is in the proper state, and leads 17, 18 to the counter.

In position b, the transistor 8 is already over the window 5, which means that group II is getting close to joint A. The controlling transistors 7, 8 and the control circuit succeeding them shift the change-over switch 19 to enable group I. This condition is maintained while group II moves across joint A (positions d and e although circuitry could be provided to enable group II in position e). As soon as both transistors 7, 8 are disposed over the opaque control track of the scale section 2a, the change-over switch 19 re-enables the transistors of group II so that the control arrangement is in the same state as in position a and the scale of section 2a is now being scanned.

During a displacement of the slide 6 from the right to the left, from 2a to 2, the change-over will be effected in the reverse order, corresponding to the sequence of positions e to a.

The embodiment has been shown only by way of example. The controlling transistors 7, 8 could be arranged also at the ends of the slide. Control tracks for being scanned by suitable transistors for actuating the change-over switch could be provided on both sides of the incremental scale 3. The direction of movement of the slide might be detected by means of suitably shaped control tracks, e.g., sawtooth-shaped control tracks, and the transistors 7, 8 so that the fourth transistor in groups I, II may be omitted. The phototransistors and associated light-emitting diodes might be replaced by other light-sensitive sensors and control means.

What is claimed is:

1. An instrument for measuring lengths, which comprises
   a scale assembly provided with a scale which has a predetermined scale increment and consisting of a plurality of sections each of which is provided with a length portion of said scale and which are separated by joints having in the longitudinal direction of said scale a width that is smaller than a predetermined width,
   a measuring slide, which is movable along said scale,
   first and second photoelectric sensor means carried by said slide and spaced apart along said scale by a distance which exceeds said predetermined width, each of said sensor means being adapted to be enabled and when enabled being adapted to photoelectrically scan said scale and to deliver a predetermined number of length signals in response to the movement of said slide along said scale to the extent of each of said increments,
   integrating means for integrating said length signals from each of said sensor means which are enabled,
   a change-over switch which is shiftable between first and second states and arranged to enable said first and second sensor means in said first and second positions, respectively, and
   control means carried by said slide and arranged to shift said change over switch from either of said states to the other in response to the movement of said sensor means which are enabled at a time to one of said joints.

2. An instrument as set forth in claim 1, in which each of said sensor means comprises phototransistor means.

3. An instrument as set forth in claim 1, in which
   each of said sensor means comprises a plurality of photoelectric sensors which are spaced predetermined distances apart along said scale,
   said predetermined distances are equal to the sum of an integral multiple of said increment and a fraction thereof, and
   the distance between said sensors at the adjacent ends of said first and second sensor means exceeds said predetermined width.

4. An instrument as set forth in claim 1, in which said integrating means comprise a counter arranged to perform a counting step in response to each of said length signals from each of said sensor means which is enabled.

5. An instrument as set forth in claim 4, in which each of said sensor means are adapted to be enabled by being connected to said counter by said change-over switch.

6. An instrument as set forth in claim 1, in which
   direction-responsive means are provided, which are adapted to generate a first sign control signal in response to a movement of said slide along said scale in a first direction and a second sign control signal in response to a movement of said slide along said scale in a second direction and
   said integrating means are adapted to integrate each of said length signals from each of said sensor means which is enabled with first and second signs in response to simultaneous first and second sign control signals respectively.

7. An instrument as set forth in claim 5, in which
   said indicating means comprise a counter arranged to perform a counting step in response of each of said length signals from each of said sensor means which are enabled, and
   said counter is arranged to increase its count in response to each of said length signals from each of said sensor means which are enabled and a simultaneous first sign control signal and to decrease its count in respose to each of said length signals from each of said sensor means which are enabled and a simultaneous second sign control signal.

8. An instrument as set forth in claim 7, in which each of said sensor means are adapted to be enabled by being connected to said counter and to said direction-responsive means by said change-over switch.

9. An instrument as set forth in claim 6, in which each of said sensor means are adapted to be enabled by being connected to said integrating means and said direction-responsive means by said change-over switch.

10. An instrument as set forth in claim 1, in which each of said sensor are adapted to be enabled by being connected to said integrating means by said change-over switch.

11. An instrument as set forth in claim 1, in which
    each of said sections is provided beside said scale with a control track and
    said control means comprise additional photoelectric means carried by said slide and adapted to photoelectrically scan said control track and arranged to deliver a control signal to said change-over switch to shift the same from either of said states to the other in response to the movement of said sensor means which are enabled at a time to one of said joints.

12. An instrument as set forth in claim 11, in which
    said additional photoelectric means comprise first and second photoelectric sensors which are respectively associated with said first and second sensor means and disposed between said first and second sensor means in the longitudinal direction of said scale.

13. An instrument as set forth in claim 11, in which said additional photoelectric means comprise phototransistor means.

* * * * *